(12) United States Patent
Lee et al.

(10) Patent No.: US 9,042,439 B2
(45) Date of Patent: May 26, 2015

(54) REFERENCE FRAME ORDERING FOR MULTI-VIEW CODING

(75) Inventors: Yung-Lyul Lee, Seoul (KR); Euee-S Jang, Seoul (KR); Chung-Ku Lee, Inchon (KR)

(73) Assignee: HUMAX HOLDINGS CO., LTD., Yongin-Si (KR)

( * ) Notice: Subject to any disclaimer, the term of this patent is extended or adjusted under 35 U.S.C. 154(b) by 1825 days.

(21) Appl. No.: 11/813,969

(22) PCT Filed: Dec. 13, 2005

(86) PCT No.: PCT/KR2005/004250
§ 371 (c)(1),
(2), (4) Date: Jul. 13, 2007

(87) PCT Pub. No.: WO2006/075844
PCT Pub. Date: Jul. 20, 2006

(65) Prior Publication Data
US 2008/0130738 A1    Jun. 5, 2008

(30) Foreign Application Priority Data

Jan. 14, 2005    (KR) .......................... 10-2005-0003948

(51) Int. Cl.
*H04N 11/02*   (2006.01)
*H04N 19/436*  (2014.01)
*H04N 19/597*  (2014.01)
*H04N 19/105*  (2014.01)
(Continued)

(52) U.S. Cl.
CPC ........... *H04N 19/436* (2014.11); *H04N 19/597* (2014.11); *H04N 19/105* (2014.11); *H04N 19/172* (2014.11); *H04N 19/61* (2014.11); *H04N 19/136* (2014.11); *H04N 19/177* (2014.11)

(58) Field of Classification Search
CPC .................................................... H04N 19/436
See application file for complete search history.

(56) References Cited

U.S. PATENT DOCUMENTS 6,055,012 A * 4/2000 Haskell et al. ................. 348/48
6,057,884 A   5/2000 Chen et al.
(Continued)

FOREIGN PATENT DOCUMENTS

JP    2000-349644 A   12/2000
KR    10-0480518 B1    4/2005

OTHER PUBLICATIONS

Li et al.; A novel multi-view video coding scheme based on H.264; Published in: Information, Communications and Signal Processing, 2003 and Fourth Pacific Rim Conference on Multimedia; Proceedings of the 2003 Joint Conference of the Fourth International Conference on; Date of Conference: Dec. 15-18, 2003; pp. 493-497 vol. 1; IEEE Xplore.*

(Continued)

*Primary Examiner* — Bradley Holder
(74) *Attorney, Agent, or Firm* — Birch, Stewart, Kolasch & Birch, LLP

(57) ABSTRACT

A method of setting an order of reference frames for multi-view coding performed by one or more processors. The method includes selecting one or more frames of the same kind that have a same-view relation with said current frame and have an inter-view relation with a frame of the same kind, which is encoded or decoded immediately before; and encoding or decoding the current frame by making reference to the selected one or more kind. Further, the one or more frames of the same kind is a P frame.

8 Claims, 9 Drawing Sheets

(51) Int. Cl.
*H04N 19/172* (2014.01)
*H04N 19/61* (2014.01)
*H04N 19/136* (2014.01)
*H04N 19/177* (2014.01)

(56) References Cited

U.S. PATENT DOCUMENTS

| | | | |
|---|---|---|---|
| 6,072,831 A | | 6/2000 | Chen |
| 7,035,453 B2* | | 4/2006 | Liu ............................... 382/154 |
| 7,778,328 B2* | | 8/2010 | Vedula et al. ............ 375/240.12 |
| 2003/0169627 A1* | | 9/2003 | Liu ............................... 365/200 |
| 2005/0031035 A1* | | 2/2005 | Vedula et al. ............ 375/240.12 |
| 2005/0129128 A1* | | 6/2005 | Chou et al. ............... 375/240.18 |
| 2006/0013490 A1* | | 1/2006 | Sun ............................... 382/232 |
| 2006/0023782 A1* | | 2/2006 | Cai et al. .................. 375/240.03 |
| 2006/0023787 A1* | | 2/2006 | Cai et al. .................. 375/240.16 |
| 2006/0029134 A1* | | 2/2006 | Winder et al. ........... 375/240.12 |
| 2006/0132610 A1* | | 6/2006 | Xin et al. .................. 348/207.99 |
| 2007/0041443 A1* | | 2/2007 | Ha et al. .................. 375/240.15 |
| 2015/0003522 A1* | | 1/2015 | Yin et al. .................. 375/240.12 |

OTHER PUBLICATIONS

Matusik et al.; 3D TV: a scalable system for real-time acquisition, transmission, and autostereoscopic display of dynamic scenes; Published in: Proceeding SIGGRAPH '04 ACM SIGGRAPH 2004 Papers; pp. 814-824; 2004; ACM Digital Library.*

* cited by examiner

US 9,042,439 B2

REFERENCE FRAME ORDERING FOR MULTI-VIEW CODING

FIELD OF THE INVENTION

The present invention relates to setting the order of reference frames, more specifically to a method for setting the order of reference frames for multi-view coding and a recorded medium recording the method.

BACKGROUND ART

In general, digital data is transmitted from a certain type of transmitting device to a certain type of receiving device. A transmitting device typically comprises an encoder encoding the data for transmission, and a receiving device typically comprises a decoder decoding the received data. A variety of digital data, such as video data, audio data, and audio/video data, can be transmitted from a transmitting device to a receiving device and outputted through a receiving device.

Dominating video compression and transmission formats comes from a family called a hybrid block-based motion-compensated transform video coder. Examples of the above coder is ITU-T VCEG video coding standards, which comprise H.261, MPEG-1, H.262/MPEG-2 video, H.263, MPEG-4 visual of VCEG (Video Coding Experts Group) and ISO/IEC MPEG (Moving Picture Experts Group) as well as the in-process draft standard H.264/AVC. Moreover, coding and compression standards are in place to synchronize and multiplex the signals for various other types of media, including still picture, audio, document, and webpage.

Video streams are generally made up in three types of frames or pictures, which are the infra frame (I frame), predictive frame (P frame), and bi-directionally predictive frame (B frame).

The I frame simply codifies the frame by discrete cosine transform, without using motion estimation/compensation. The P frame does motion estimation/compensation while referring to the I frame or other P frames, and then codifies the rest of the data by discrete cosine transform. The B frame does motion compensation, like the P frame, but carries out motion estimation/compensation from two frames on the time axis.

The sequence in video stream is defined by a segment called the group of pictures (GOP). In the structure of I, B, B, P, B, B, P, . . . , the GOP refers to the frames between an I frame to the next I frame. Generally, when displayed at an intended rate, the GOP is structured in a set of pictures having a predetermined duration (e.g., 0.5 seconds).

Generally, the MPEG-2 video stream or sequence is defined by a segment called GOP. Typically, the GOP is structured in a set of pictures having a duration of 0.5 seconds, when displayed at an intended rate.

As described above, the medium for delivering picture information such as video stream has been developed from the 2-dimensional terminal technology, such as television. In other words, as the development moves from black and white pictures to color pictures, as in SD (standard definition) television and high-resolution television (e.g., HDTV), the data amount of picture information is increasing.

Consequently, the current picture information is not 2-dimensional but 3-dimensional, and thus development of technologies related to 3-dimensional picture information is needed in order to deliver reproduce realistic, natural multimedia information.

However, since the technology standard such as MPEG-2 is for coding and decoding video from one view, the design of structure and process of data for expressing multi-view information is needed in order to codify multi-view video data. Although technology standards are proposing MVP (multi-view profile) for expanding the video used in MPEG-2 to a stereo video, this still does not suggest a proper solution for coding multi-view video.

SUMMARY OF THE INVENTION

Contrived to solve the above problems, the present invention aims to provide a method for setting the order of reference frames and a recorded medium recording the method that can provide better picture quality and 3-dimensionality owing to utilizing more reference frames.

The invention also aims to provide a method for setting the order of reference frames for multi-view coding and a recorded medium recording the method that can prevent the delay in process time when using the reference frame.

Another object of this invention is to provide a method for setting the order of reference frames for multi-view coding and a recorded medium recording the method that can maintain an optimal efficiency while the encoder and decoder are encoding and decoding.

Another object of the present invention is to provide a method for setting the order of reference frames for multi-view coding and a recorded medium recording the method that allows a user to select a picture of desired direction among pictures of various directions inputted through multiple cameras.

In order to achieve the above objects, a first aspect of the present invention provides a method for setting the order of reference frames for multi-view coding.

According to a preferred embodiment, the method for setting the order of reference frames for multi-view coding can comprise the steps of selecting the n (integer) number of frames of the same kind that have a same-view relation with the current frame and are encoded or decoded prior to the current frame as a first reference frame, selecting the m (integer) number of frames of the same kind that have a same-view relation with the current frame and have an inter-view relation with a frame of the same kind, which is encoded or decoded immediately before, as a second reference frame, wherein the frame of the same kind has a same-view relation with the current frame, and encoding or decoding the current frame by making reference to the frames of the same kind included in the first reference frame and the second reference frame.

The n number of frames of the same kind, included in the first reference frame, can be extracted in the reverse order of encoding or decoding.

In case the method further comprises the step of selecting the k (integer) number of frames of the same kind having an inter-view relation with the current frame as a third reference frame, the current frame can be encoded or decoded by making reference to the frames of the same kind included in the first through third reference frames.

The frame of the same kind can be a P frame of a B frame that is the same kind as the current frame.

A plurality of frames generated by the plurality of cameras in the temporal order of an I frame, a first B frame, a second B frame, and a P frame can be encoded or decoded in the order of an I frame, a P frame, a first B frame, and a second B frame about the time axis.

Picture information inputted by the plurality of cameras can be generated as one of the forms consisting of 1-D parallel data, 1-D arc data, and 2-D parallel data.

In order to achieve aforementioned objects, a second aspect of the present invention provides a recorded medium recording a program for executing a method of setting the order of reference frames for multi-view coding.

According to a preferred embodiment of the present invention, the program recorded in the recorded medium is a program of instructions executable by a transmitting device or a receiving device, and can execute the steps of selecting the n (integer) number of frames of the same kind that have a same-view relation with the current frame and are encoded or decoded prior to the current frame as a first reference frame, wherein the current frame is a frame to be currently encoded or decoded among a plurality of frames successively generated by a plurality of cameras along the time, selecting the m (integer) number of frames of the same kind that have a same-view relation with the current frame and have an inter-view relation with a frame of the same kind, which is encoded or decoded immediately before, as a second reference frame, wherein the frame of the same kind has a same-view relation with the current frame, and encoding or decoding the current frame by making reference to the frames of the same kind included in the first reference frame and the second reference frame.

The n number of frames of the same kind, included in the first reference frame, can be extracted in the reverse order of encoding or decoding.

In case the method further comprises the step of selecting the k (integer) number of frames of the same kind having an inter-view relation with the current frame as a third reference frame, the current frame can be encoded or decoded by making reference to the frames of the same kind included in the first through third reference frames.

The frame of the same kind can be a P frame of a B frame that is the same kind as the current frame.

A plurality of frames generated by the plurality of cameras in the temporal order of an I frame, a first B frame, a second B frame, and a P frame can be encoded or decoded in the order of an I frame, a P frame, a first B frame, and a second B frame about the time axis.

Picture information inputted by the plurality of cameras can be generated as one of the forms consisting of 1-D parallel data, 1-D arc data, and 2-D parallel data.

DESCRIPTION OF EMBODIMENTS OF INVENTION

Figure 1:
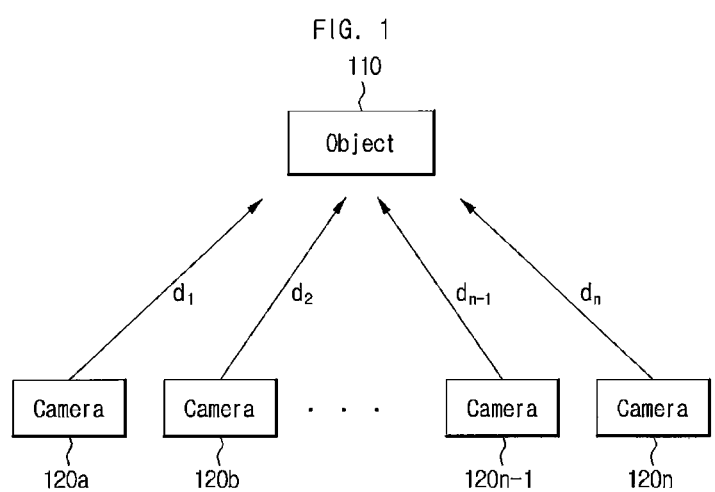
FIG. 1 shows an arrangement of a plurality of cameras for inputting 1-D parallel data, based on a preferred embodiment of the present invention.

In order to fully understand the present invention, the advantages of the present invention, and the objects achieved by embodying the present invention, the accompanying drawings illustrating embodiments of the present invention and their disclosed description must be referenced.

Below, preferred embodiments of the present invention will be described with reference to the accompanying drawings. To aid the overall understanding, the same reference numerals are used for the same means, regardless of the Fig. number.

Figure 2:
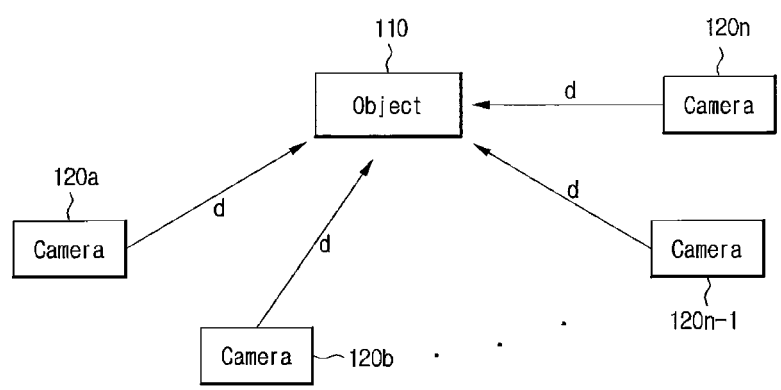
FIG. 2 shows an arrangement of a plurality of cameras for inputting 1-D arc data, based on a preferred embodiment of the present invention.
Figure 3:
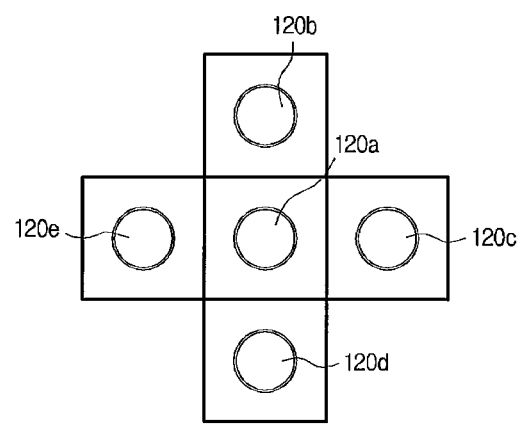
FIG. 3 shows an arrangement of a plurality of cameras for inputting 2-D parallel data, based on a preferred embodiment of the present invention.

FIG. 1 is an arrangement of a plurality of cameras for inputting 1-D parallel data, based on a preferred embodiment of the present invention, while FIG. 2 is an arrangement of a plurality of cameras for inputting 1-D arc data, based on a preferred embodiment of the present invention, and FIG. 3 is an arrangement of a plurality of cameras for inputting 2-D parallel data, based on a preferred embodiment of the present invention.

In the arrangement of a plurality of cameras for inputting 1-D parallel data, as shown in FIG. 1, the n number of cameras, represented by 120a, 120b . . . 120n-1, and 120n, are arranged in a line about the camera that is arranged perpendicular to an object 110.

When the n number of cameras 120a, 120b . . . 120n-1, 120n are arranged according to a method shown in FIG. 1, the distance between each camera and the object is different from each other. Of course, the distances between either side of the central camera and the object 110 may be the same.

In the arrangement of a plurality of cameras for inputting 1-D arc data, as shown in FIG. 2, the n number of cameras, represented by 120a, 120b . . . 120n-1, and 120n, are sequentially arranged on an arc with a fixed distance d to an object 110.

When the n number of cameras 120a, 120b . . . 120n-1, 120n are arranged according to a method shown in FIG. 2, the distance between each camera and the object 110 is the same.

In the arrangement of a plurality of cameras for inputting 2-D parallel data, as shown in FIG. 3, a plurality of cameras, represented by 120a, 120b, 120c, 120d, and 120e, are arranged on a pre-designated shape of structure according to a predetermined rule. FIG. 3 illustrates a cross-shaped structure, on which each camera is arranged on the center and each projecting part. However, there can be an unlimited variety of structural shapes and the number of cameras to arrange a plurality of cameras on a structure.

Each camera arranged by each method illustrated in FIGS. 1-3 receives object images inputted through the installed lens angle, with the passage of time, and generates picture information, and the picture information is structured in segments, called GOP, of I, B, B, P, B, B, P, . . . , as described earlier.

The method of setting the order of reference frames and/or the scope of reference frames for efficiently encoding or decoding each frame of picture information generated by each method of camera arrangement is different from each other, and thus the description will be made below by making reference to the relevant figure.

Figure 4:
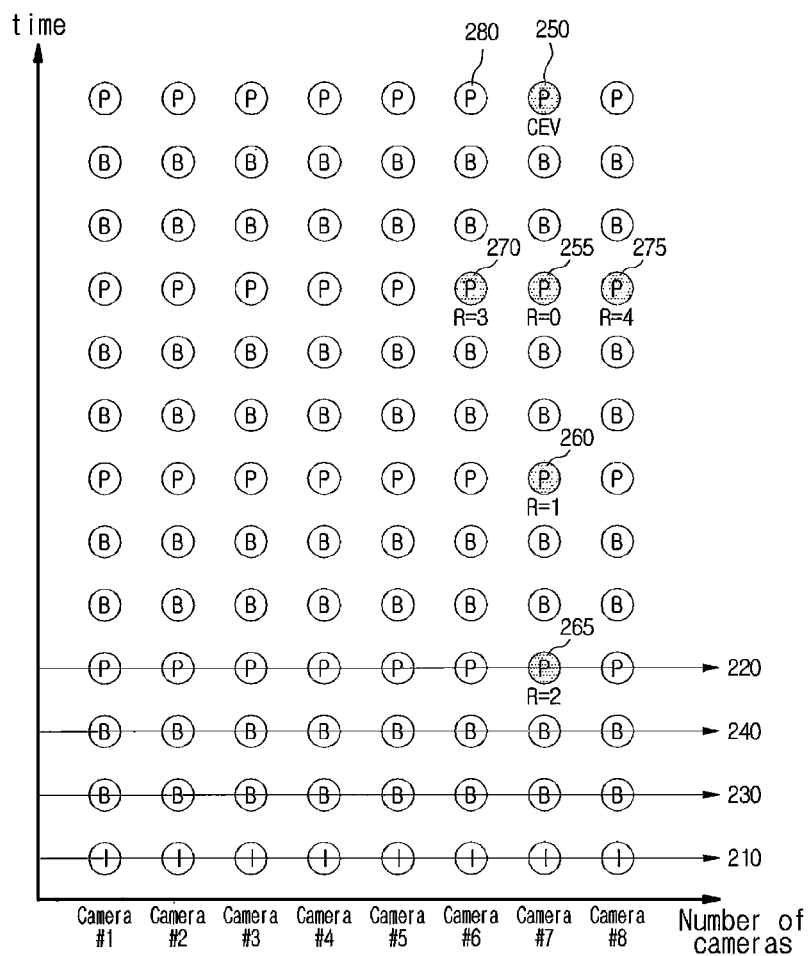
FIG. 4 shows a method of setting the order of reference frames in case the input data are 1-D parallel data and 1-D arc data, based on a preferred embodiment of the present invention.

FIG. 4 is a method for setting the order of reference frames when the input data are 1-D parallel data and 1-D arc data, based on a preferred embodiment of the present invention.

As shown in FIG. 4, the GOP of 1-D parallel data and 1-D arc data can be structured in the order of I frame, P frame, B frame, B frame, P frame, and B frame, and the frames arranged along the x-axis (i.e., time) refer to picture information independently generated by each camera. The GOP of this invention may be set to have the duration of, for example, 1 second.

The encoding/decoding of multi-view coding on 1-D parallel data and 1-D arc data is carried out in the order of 210, 220, 230, and 240. That is, after processing I frames generated at a same moment, P frames are processed, and then the previously generated B frames are processed before the later generated B frames are processed. Then, since there is no I frame until the next GOP, the process is repeated in the order of P frame, B frame, and B frame.

Suppose, in this process order, a P frame 250 (hereinafter referred to as "current frame") has to be encoded or decoded. Here, a transmitting device and/or receiving device can use relevant P frame information as reference frames in order to encode or decode the P frame 250. In FIG. 4, CEV means the current frame to be decoded or encoded, and R means the reference frame index ordering.

In other words, in order to encode or decode the current frame, the transmitting device and/or receiving device extracts and references information related to a first P frame 255 (R=0), which is a frame of the same kind encoded or decoded immediately before the current frame, a second P frame 260 (R=1), which is a frame of the same kind encoded or decoded immediately before the first P frame 255, a third P frame 265 (R=2), which is a frame of the same kind encoded or decoded immediately before the second P frame 260, and a third P frame 270 (R=4) and fourth P frame 275 (R=5), which are frames of the same kind encoded or decoded by being generated by installed cameras at a moment near the first P frame 255. Here, the first P frame 255, the second P frame 260, and the third P frame 265 can be said to be same-views inputted through the same camera on the continuous time axis, and the fourth P frame 270 and the fifth P frame 275 can be said to be inter-views inputted through neighboring cameras on the time axis that are the same as the first P frame 265. Of course, the number of reference frames and the order of reference, for encoding and/or decoding the current frame, can be different based on the method of realization. For example, a sixth P frame 280, which is an inter-view inputted through a neighboring camera on the time axis that is the same as the current frame 250.

In the method of setting the order of reference frames described above, the encoding and/or decoding is conducted by a single processor.

However, a transmitting device and/or receiving device can be made to have a plurality of processors independently encode and/or decode the frames generated by any cameras. For example, a first processor processes the frames generated by the first and fourth cameras, and the second processor processes the frames generated by the second and fifth cameras, while the third processor processes the frames generated by the third and sixth cameras. In this case, when setting a reference frame for the current frame, if frames processed by other processors are set as the reference frames, other processors must complete the processing of the reference frames before the current frame is processed. Unless this premise is not fulfilled, delays will be inevitable for the processing of the current frame as well as the processing of another current frame that sets the current frame as a reference frame. Hence, if a plurality of processors process the frames in parallel, the process efficiency can be improved by, for example, setting the same-views only as the reference frame.

Although the process of P frames by a transmitting device and/or receiving device has been described above, it should be apparent that the same method can be applied to B frames, and thus the description will not be provided here.

Figure 5:
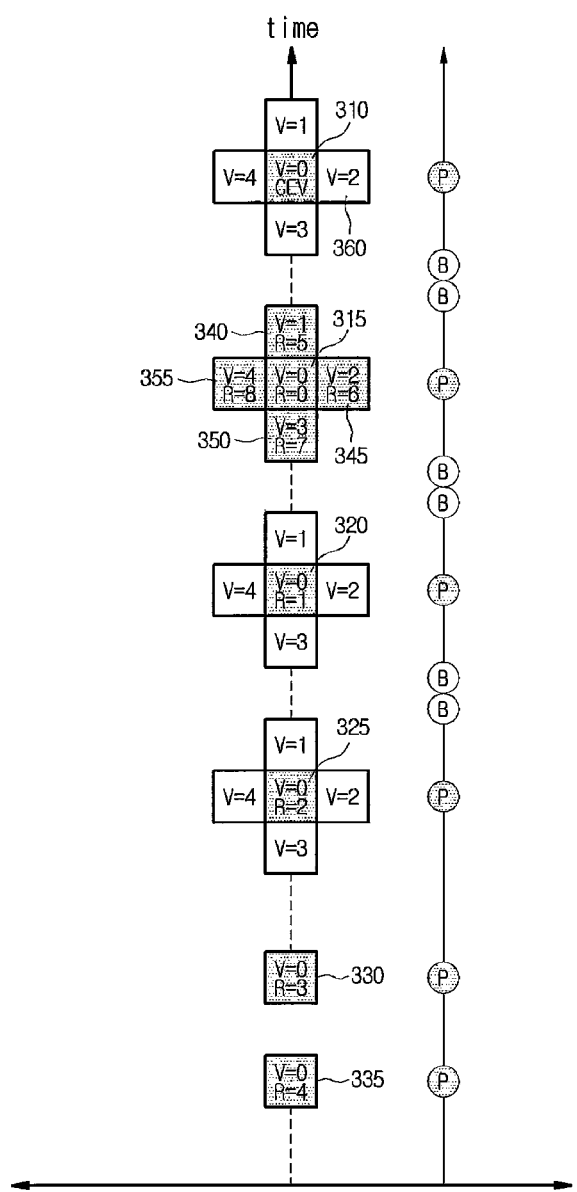
FIG. 5 shows a method of setting the order of reference frames in case the input data is 2-D parallel data, based on a preferred embodiment of the present invention.

FIG. 5 illustrates a method of setting the order of reference frames in case the input data is 2-D parallel data, based on a preferred embodiment of the present invention.

As shown in FIG. 5, the GOP of 2-D parallel data can be structured in the order of I frame, P frame, B frame, B frame, P frame, and B frame. In FIG. 5, the cameras are arranged in a cross shape. For the purpose of easy understanding, the arrangement of each frame is made to be identical to the arrangement of the camera. In this invention, the GOP can be set to have the duration of, for example, 1 second.

As described earlier, the encoding/decoding of multi-view coding on 2-D parallel data can be processed in the order of I frame, P frame, B frame, and B frame, and since there is no I frame until the next GOP, the process can be repeated in the order of P frame, B frame, and B frame.

Suppose, in this process order, that a P frame 310 (hereinafter referred to as "current frame") is to be encoded or decoded. Here, a transmitting device and/or receiving device can use relevant P frame information as reference frames in order to encode or decode the current frame 350. In FIG. 5, CEV means the current frame to be decoded or encoded, and R means the reference frame index ordering.

In other words, in order to encode or decode the current frame, the transmitting device and/or receiving device extracts and references information related to a plurality of P frames, represented by 315, 320, 325, 330, and 335, having a same-view relation as a frame of the same kind encoded or decoded sequentially before the current frame, and P frames, represented by 340, 345, 350, and 355, having an inter-view relation with the P frame 315, which has a same-view relation as a frame of the same kind encoded or decoded immediately before. Here, the same-views can be said to be frames inputted through the same camera on the continuous time axis, and the inter-views can be said to be frames inputted independently through a plurality of cameras on the same time axis. Of course, the number of reference frames and the order of reference, for encoding and/or decoding the current frame, can be different based on the method of realization. For example, in case 360 is the current frame, 310, which is already encoded or decoded after being encoded through a different camera on the same time axis, can be used as a reference frame.

In the method of setting the order of reference frames described above, the encoding and/or decoding is conducted by a single processor. However, a transmitting device and/or receiving device can be made to have a plurality of processors independently encode and/or decode the frames generated by any cameras. In this case, when setting a reference frame for the current frame, frames processed by other processors can be restricted from being set as reference frames, thereby improving the process efficiency.

Although the process of P frames by a transmitting device and/or receiving device has been described above, it should be apparent that the same method can be applied to B frames, and thus the description will not be provided here.

FIGS. 6 through 9 illustrate graphs comparing the bit rate and signal-to-noise ratio according to a method for setting the order of reference frames for multi-view coding based on the anchor and the present invention.

In the graphs shown in FIGS. 6-9, the x-axis indicates the bit rate, and the y-axis indicates the peak signal-to-noise ratio (PSNR). The anchor of each graph indicates the conventional method of successively encoding or decoding the frames generated in a time sequence per each camera without referring to the frames generated by other cameras.

Figure 6:
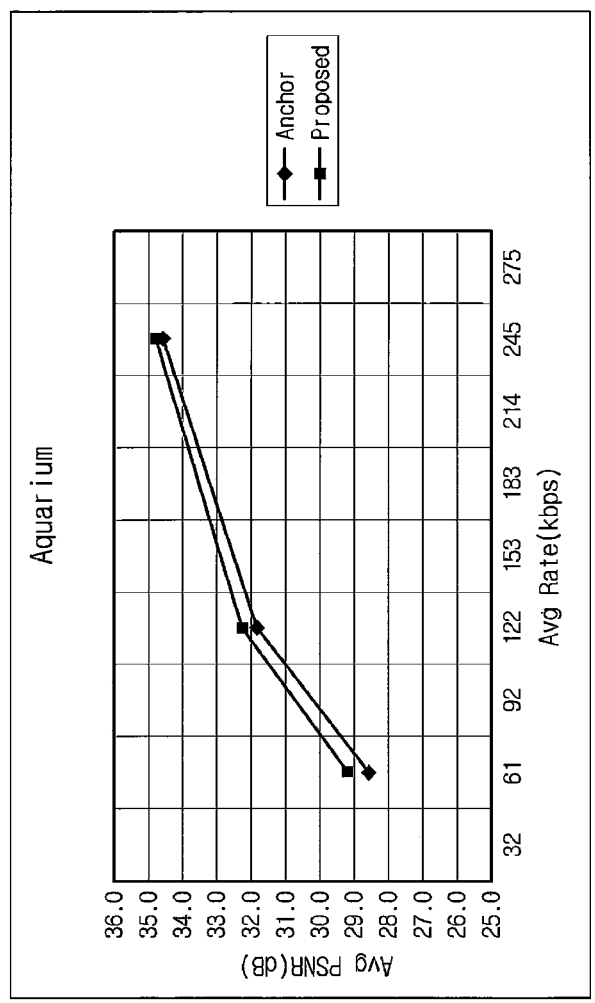
FIGS. 6-9 show graphs comparing the bit rate and signal-to-noise ratio according to a method for setting the order of reference frames for multi-view coding based on the anchor and the present invention.

FIG. 6 is a comparison graph for the case of an aquarium having 1-D arc data inputted by arranging a plurality of cameras, for example, 15 cameras. As shown in FIG. 6, when the method of setting the order of reference frames for multi-view coding based on the present invention is used, an improvement of 0.5-0.8 dB in picture quality is shown over the conventional method.

Figure 7:
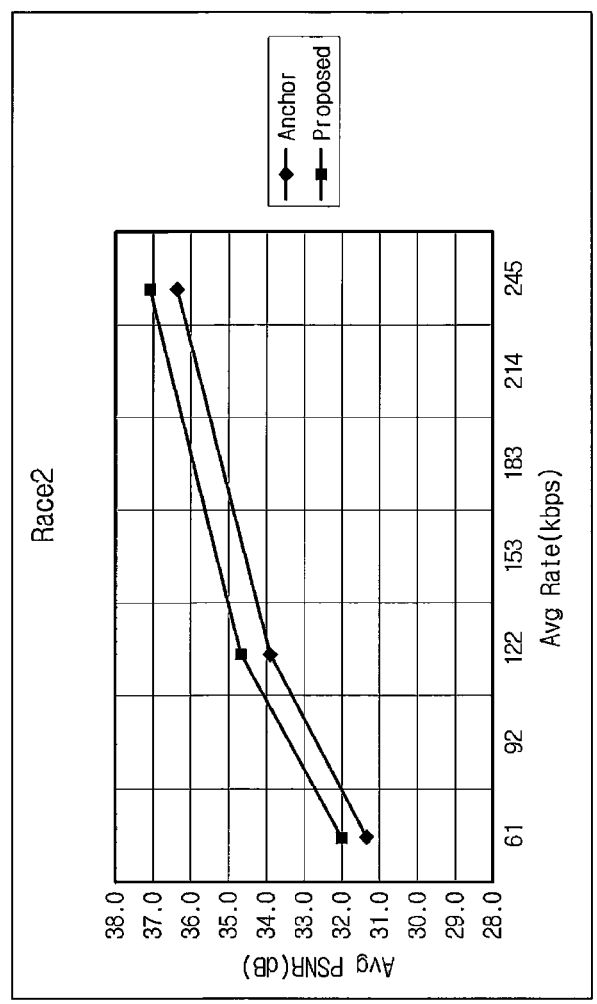

FIG. 7 is a comparison graph for the case of a horserace having 1-D parallel data inputted by arranging a plurality of cameras, for example, 8 cameras. As shown in FIG. 7, when the method of setting the order of reference frames for multi-view coding based on the present invention is used, an improvement of 0.4-0.9 dB in picture quality is shown over the conventional method.

Figure 8:
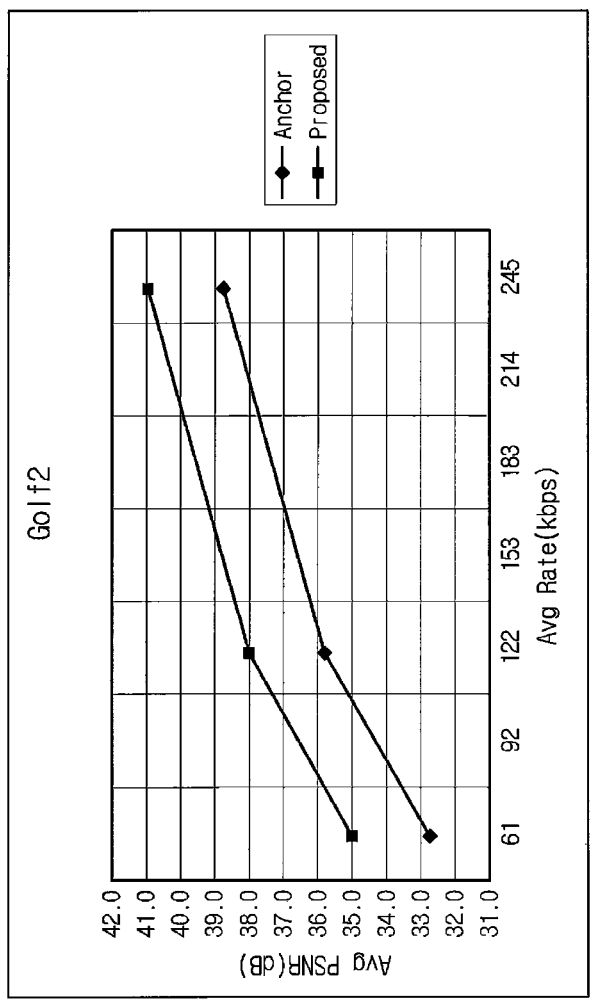

FIG. 8 is a comparison graph for the case of a golf swing having 1-D parallel data inputted by arranging a plurality of cameras, for example, 8 cameras. As shown in FIG. 8, when the method of setting the order of reference frames for multi-view coding based on the present invention is used, an improvement of 2.2-2.5 dB in picture quality is shown over the conventional method.

Figure 9:
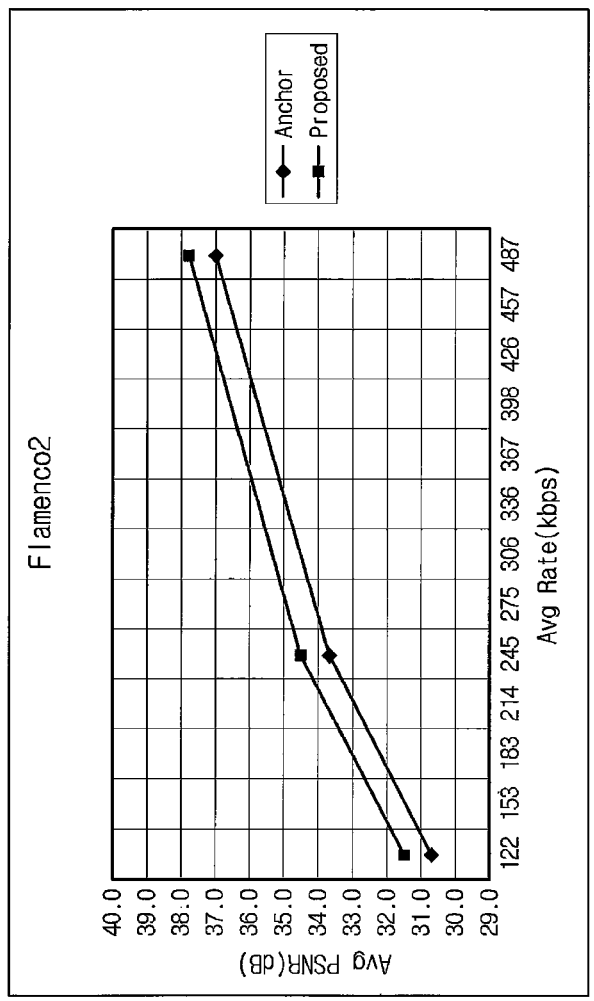

FIG. 9 is a comparison graph for the case of a flamenco dance having 2-D parallel data inputted by arranging a plurality of cameras, for example, 5 cameras. As shown in FIG. 9, when the method of setting the order of reference frames for multi-view coding based on the present invention is used, an improvement of 0.3-1.0 dB in picture quality is shown over the conventional method.

The drawings and disclosure are examples of the present invention, used to describe the present invention, shall by no means be construed to limit or restrict the scope of the present invention disclosed in the appended claims. Any person of ordinary skill in the art to which the invention pertains shall understand that a very large number of permutations and equivalent embodiments are possible. The true scope of the present invention shall only be defined by the appended claims.

As described above, a method for setting the order of reference frames for multi-view coding and a recorded medium recording the method, based on the present invention, can provide an improved picture quality and three-dimensionality and prevent the delay in processing time when using the reference frame by utilizing a larger number of reference frames.

The present invention also allows the encoder and decoder to maintain an optimal efficiency when encoding and decoding, respectively.

Moreover, the present invention allows a user to select a picture with a desired direction among pictures with a variety of direction that are inputted through a plurality of cameras.

Furthermore, the present invention can utilize the bypass logic, which is much simpler than the conventional bus-control logic.

The invention claimed is:

1. A method of setting an order of reference frames for multi-view coding performed by a plurality of processors, the method comprising:
    selecting, by the plurality of processors, one or more first frames of a same kind that have a same-view relation with a current frame, the one or more first frames being encoded or decoded prior to the current frame by a processor used to encode or decode the current frame;
    selecting, by the plurality of processors, one or more second frames of the same kind having an inter-view relation with a specific frame of the one or more first frames, the specific frame being encoded or decoded immediately before the current frame by the processor used to encode or decode the current frame; and
    encoding or decoding, by the plurality of processors, the current frame by making direct reference, with respect to any of the frames of the same kind as the current frame, to the selected one or more first frames and the selected one or more second frames,
    where the current frame is one of a plurality of frames that are generated by a plurality of cameras in a temporal order of an I frame, a first B frame, a second B frame, and a P frame, the plurality of frames being encoded or decoded in an order of the I frame, the P frame, the first B frame, and the second B frame about a time axis.

2. The method of claim 1, wherein the one or more first frames of the same kind are extracted in the reverse order of encoding or decoding.

3. The method of claim 1, wherein the current frame is one of a plurality of frames that includes picture information input by a plurality of cameras, the picture information being generated as one of 1-D parallel data, 1-D arc data, and 2-D parallel data.

4. The method of claim 1, wherein the encoding or decoding the current frame by making reference to the selected one or more first frames and the selected one or more second frames includes:
    encoding or decoding the current frame by making direct reference to the selected one or more first frames and the selected one or more second frames.

5. A non-transitory recorded medium embodying a program of instructions executable by an encoding device or a decoding device having a plurality of processors for setting an order of reference frames for multi-view coding, the program readable by the encoding device or decoding device, the recorded medium for executing, via the plurality of processors, the instructions embodied on the recorded medium for performing the following steps:
    selecting, by the plurality of processors, one or more first frames of a same kind that have a same-view relation with a current frame, the one or more first frames being encoded or decoded prior to the current frame by a processor used to encode or decode the current frame;
    selecting, by the plurality of processors, one or more second frames of the same kind having an inter-view relation with a specific frame of the one or more first frames, the specific frame being encoded or decoded immediately before the current frame by the processor used to encode or decode the current frame; and
    encoding or decoding, by the plurality of processors, the current frame by making direct reference, with respect to any of the frames of the same kind as the current frame, to the selected one or more first frames and the selected one or more second frames,
    where the current frame is one of a plurality of frames generated by a plurality of cameras in a temporal order of an I frame, a first B frame, a second B frame, and a P frame, the plurality of frames being encoded or decoded in an order of the I frame, the P frame, the first B frame, and the second B frame about a time axis.

6. The recorded medium of claim 5, wherein the one or more first frames of the same kind are extracted in the reverse order of encoding or decoding.

7. The recorded medium of claim 5, wherein the current frame is one of a plurality of frames that includes picture information input by a plurality of cameras, the picture information being generated as one of 1-D parallel data, 1-D arc data, and 2-D parallel data.

8. The recorded medium of claim 5, wherein the encoding or decoding the current frame by making reference to the selected one or more first frames and the selected one or more second frames includes:
    encoding or decoding the current frame by making direct reference to the selected one or more first frames and the selected one or more second frames.

* * * * *